United States Patent

Ludwig

Patent Number: 5,645,470
Date of Patent: Jul. 8, 1997

[54] METHOD OF HONING A KNIFE BLADE

[76] Inventor: Andre Ludwig, 1075 Carrick St., Thunder Bay Ontario, Canada, P7B 5P9

[21] Appl. No.: 559,715

[22] Filed: Nov. 15, 1995

[51] Int. Cl.$^6$ ........................................ B24B 1/00
[52] U.S. Cl. ............... 451/45; 451/59; 451/192; 451/234; 451/527
[58] Field of Search ........................ 451/45, 59, 192, 451/193, 195, 196, 234, 235, 419, 420, 495, 496, 497, 488, 533, 527

[56] References Cited

U.S. PATENT DOCUMENTS

| | | | |
|---|---|---|---|
| 977,624 | 12/1910 | Guhl | 451/192 |
| 1,144,467 | 6/1915 | Fix . | |
| 1,197,619 | 9/1916 | Fullen et al. . | |
| 1,335,603 | 3/1920 | Roberts . | |
| 1,594,827 | 8/1926 | Fix | 451/45 |
| 2,022,569 | 11/1935 | Molins | 451/419 |
| 2,035,249 | 3/1936 | Steiner | 451/192 |
| 2,037,509 | 4/1936 | Hartman . | |
| 2,692,457 | 10/1954 | Bindszus . | |
| 2,720,059 | 10/1955 | Shobrook | 451/234 |
| 2,771,722 | 11/1956 | Field | 451/527 |
| 3,032,934 | 5/1962 | Johnsa | 451/45 |
| 3,461,616 | 8/1969 | Nissen et al. | 451/45 |
| 3,494,081 | 2/1970 | Taylor et al. | 451/45 |
| 3,581,439 | 6/1971 | Jensen | 451/533 |
| 3,597,887 | 8/1971 | Hall | 451/527 |
| 4,265,055 | 5/1981 | Cartwright et al. | 451/45 |
| 4,807,401 | 2/1989 | Atwater . | |
| 5,542,875 | 8/1996 | Ichiguchi | 451/533 |

FOREIGN PATENT DOCUMENTS

| | | | |
|---|---|---|---|
| 478352 | 6/1954 | Italy | 451/492 |

*Primary Examiner*—James G. Smith
*Assistant Examiner*—Dona C. Edwards
*Attorney, Agent, or Firm*—Adrian D. Battison; Murray E. Thrift

[57] ABSTRACT

A honing process for a long knife blade such as that used in chipping wood products comprises two honing bodies each formed by a shaft carrying three honing discs with the shafts spaced by a distance less than the radius of the discs so the discs interleave and are spaced along each shaft by a distance substantially equal to the width of the discs so that the side edges of the discs lie immediately adjacent. The discs are rotated in directions so they move into the cusp formed between the discs. The long knife blade is inserted into the line of the cusp which lies parallel to the axes of rotation of the honing bodies and is moved back and forth along that line in a honing action. The length of the knife blade is greater than the width of the discs and generally significantly greater than at least two of the discs so that the knife blade remains bridged across the discs during the movement.

12 Claims, 4 Drawing Sheets

METHOD OF HONING A KNIFE BLADE

BACKGROUND OF THE INVENTION

The invention relates to a method of honing a knife sharp edge which is particulary but not necessarily applicable to the type of blades used in the wood processing industry which often have a blade length of greater than 10 inches and have a blade which is relatively thick generally greater than 0.3 inches so that it defines to parallel side faces and an inclined cutting face extending from a forward sharp edge at one face rearwardly across the blade o he other face. Generall his knife blade is sharpened by grinding the inclined face so that it is flat and all chips and grooves are removed. However this grinding action leaves a burr wire at the edge which must be removed b honing. Up till now the honing has been done manually with a hand held stone. It has been known for man years that the honing action is unsatisfactory but no alternative has been available.

SUMMARY OF THE INVENTION

According to the invention, therefore, there is provided a method of honing a knife blade comprising providing a first and a second honing body each honing body having an axis of rotation; each honing body having thereon at least one disc defining a generall cylindrical outer surface and two side surfaces at right angles to an axis o the disc, the disc axis being coaxial with the axis of rotation of the honing body mounting the honing bodies with he axes thereof parallel and spaced by distance less than radii of the discs and with the disc of the honing bodies offset in a direction parallel to the axes such that said at least one disc of the first honing body intermeshes with so that at least one disc of the second honing body to define a cusp therebetween; forming the disc such that the cylindrical outer surfaces thereof are defined b a flexible fibrous material; engaging the knife into the cusp so as to engage simultaneously the first and second honing bodies; the knife blade having a length greater than an axial length between the side surfaces of the discs so as to engage simultaneously in said cusp at least one disc of each of said first and second honing bodies; rotating each of the honing bodies about its axis in a direction such that the outer surface of said at least one disc moves into the cusp; and moving the knife blade while in the cusp in a direction parallel to the axes of the honing bodies.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
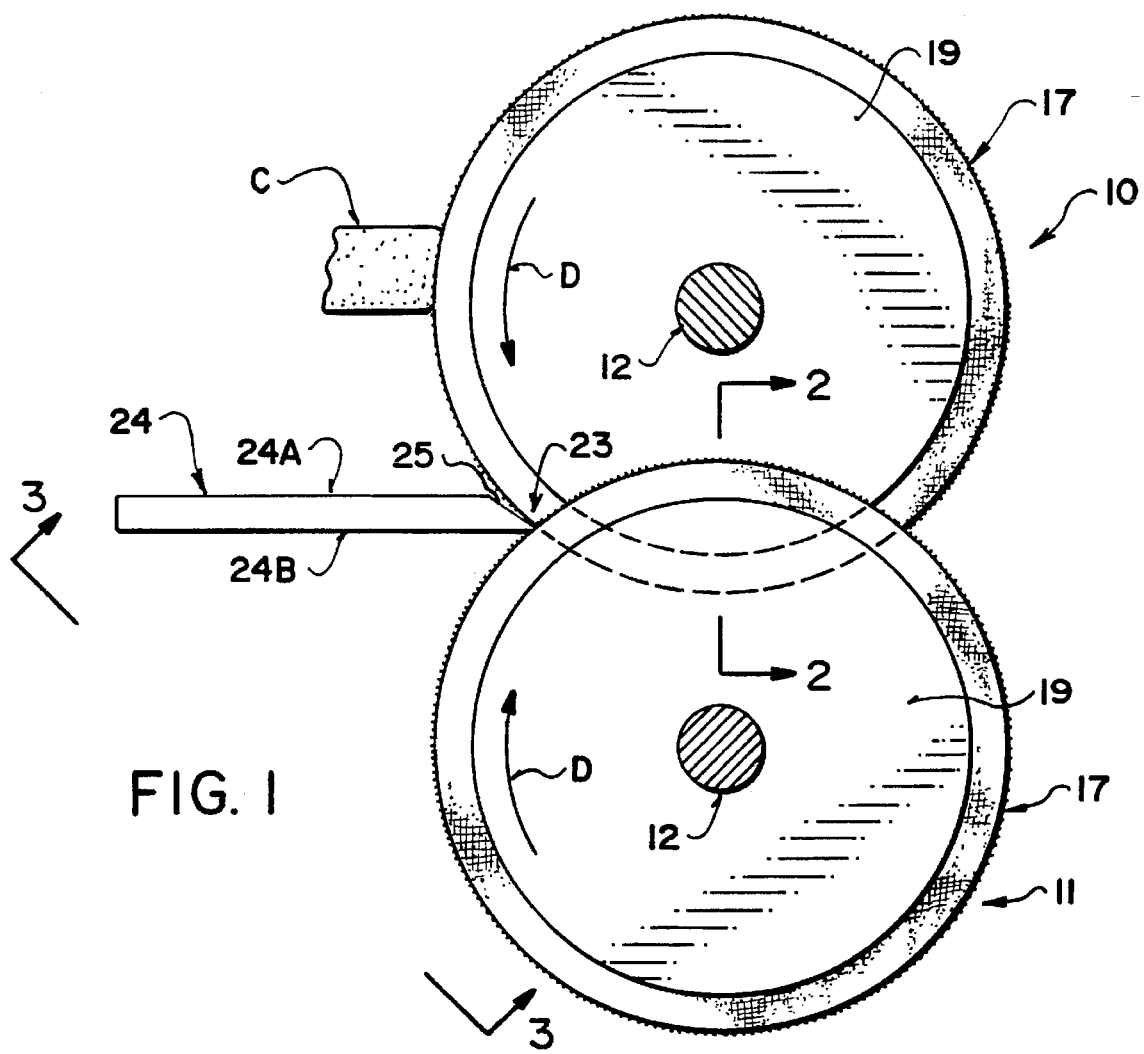
FIG. 1 is a vertical cross-sectional view through an apparatus for honing using the method of the present invention.
Figure 2:
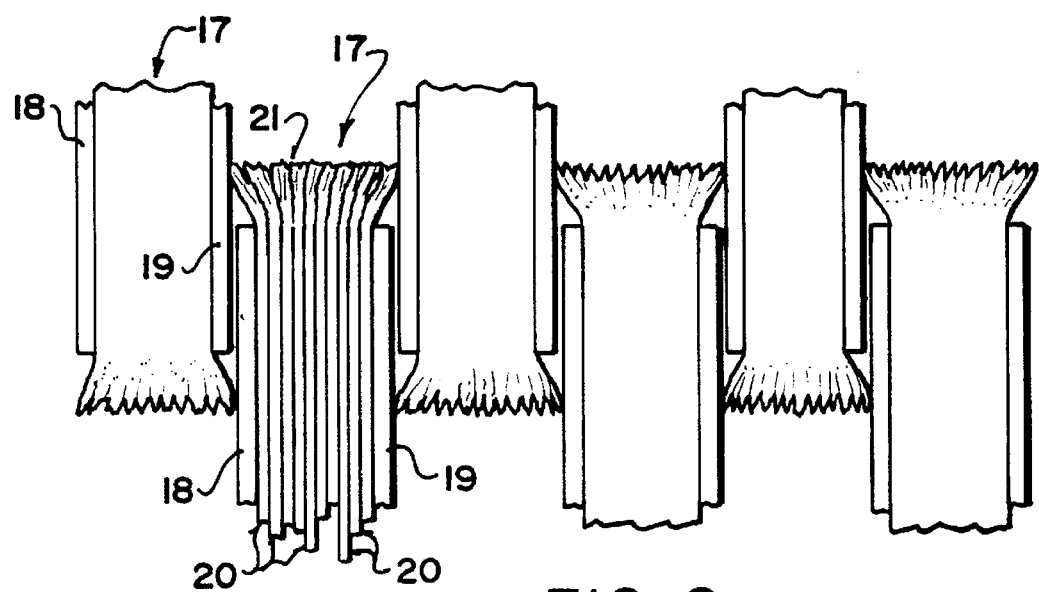
FIG. 2 is a cross-sectional view along the lines 2—2 of FIG. 1.
Figure 3:
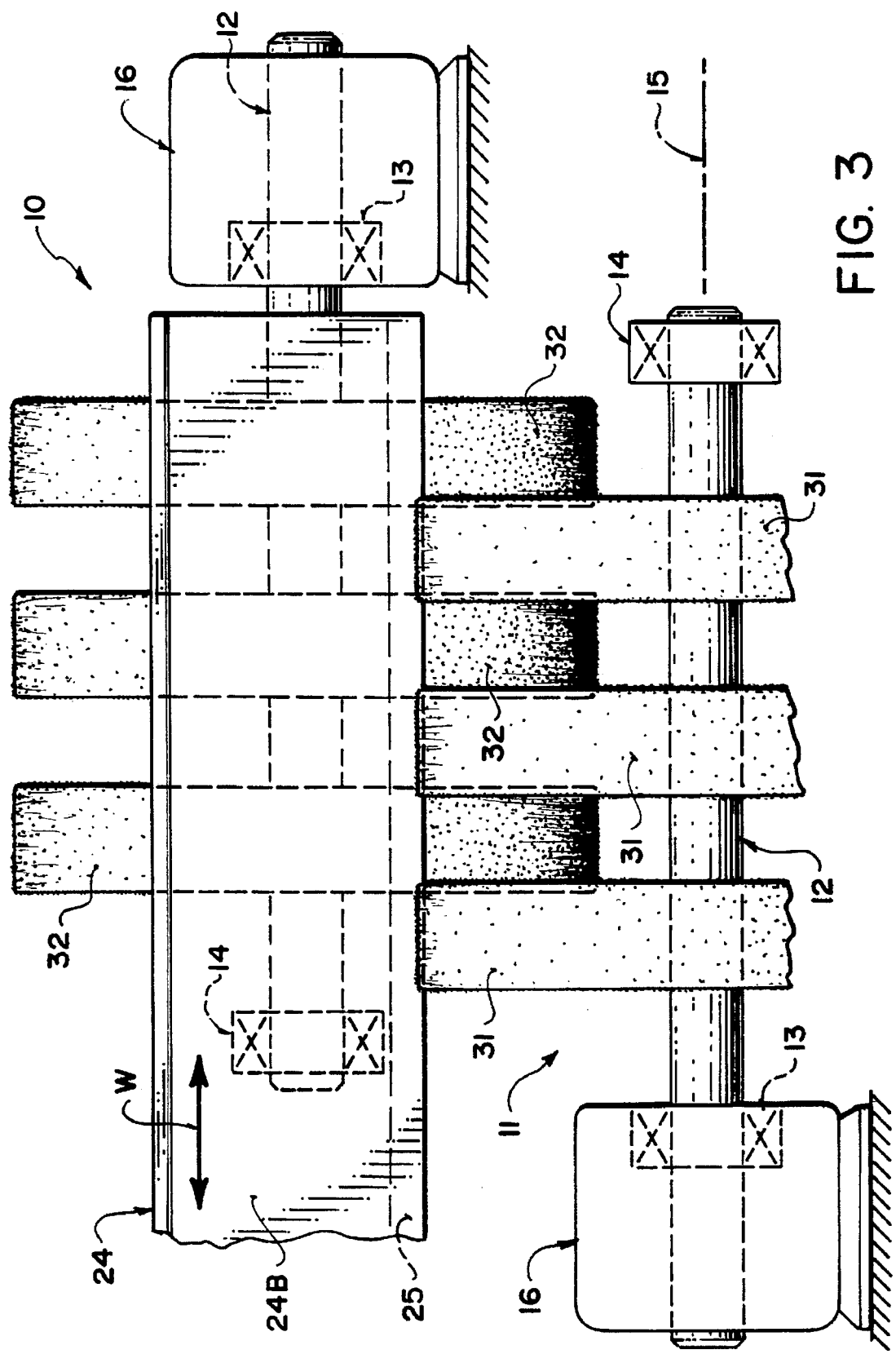
FIG. 3 a view along the lines 3—3 of FIG. 1.

The apparatus comprises a first honing body 10 and a second honing body 11. Each of the honing bodies is substantially identical and comprises a main shaft 12 carried in bearings 13 and 14 for rotation about a longitudinal axis 15 of the shaft. The shaft is driven by a motor 16 which in the example shown is an individual electric motor although the shaft may be driven by a chain drive from a common drive motor.

On the shaft is mounted three honing discs 17 each of which is formed by a pair of clamping plates 18, 19 which are arranged in spaced radial planes of the axis 15 with the clamping plates clamping between them a plurality of disc elements 20 of a nylon or similar fabric material so that peripheral edges of the sheets form a generally cylindrical outer edge surface 21 of the honing disc.

Figure 7:
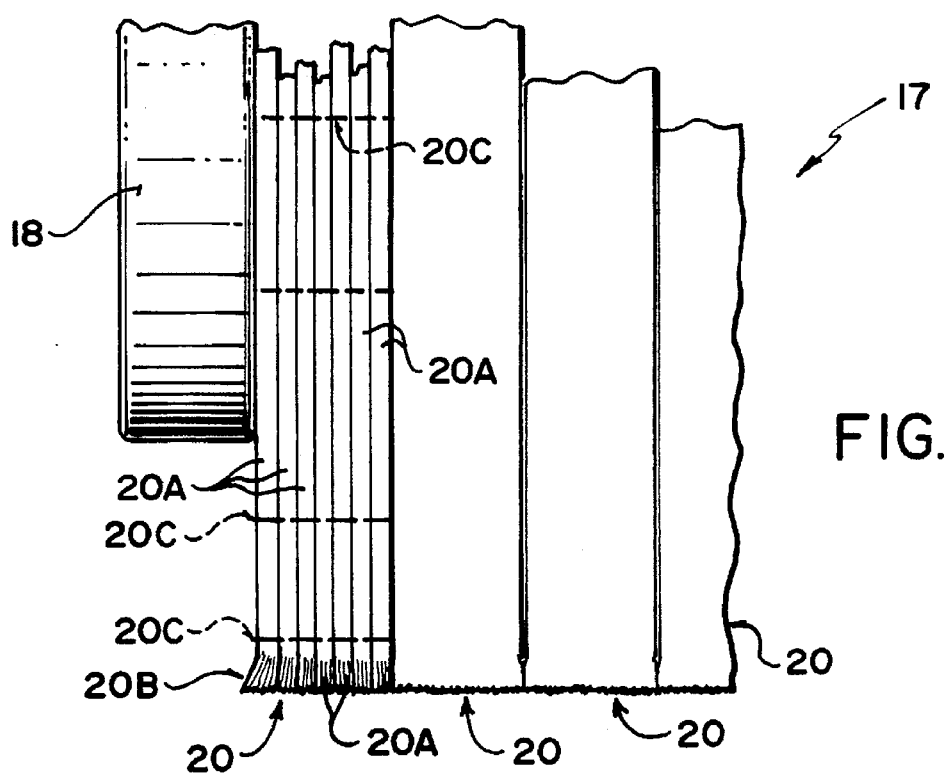
FIG. 7 is a cross-sectional view similar to that of FIG. 2 on an enlarged scale showing further detail of the construction of the discs.

Such honing disc elements are previously known and are used on a drive shaft of a honing machine for engagement of a narrow knife or chisel against the outer surface of the disc. The discs are therefore commercially available. As shown in FIG. 7, each disc element comprises a plurality of separate sheets 20A of a woven fabric which are connected together in face to face arrangement and of the same diameter. The sheets thus provide yarns and fibers 20B at the edge due to the cutting of the woven sheet which are loose at the edge and thus define a fibrous outer edge of the disc element. The disc element is formed into a disc structure by quilted stitch lines 20C arranged in circles around the center of the disc or preferably in a spiral, thus holding the sheets in a stack of the sheets.

In the present invention, however, the shafts carry three such discs so that each honing body is formed by the three discs with those discs being spaced along the length of the shaft by a distance substantially equal to the width of a disc such that the discs of one honing body intermesh with the discs of the other honing body since the shafts are spaced by a distance less than the radii of the honing discs.

This intermeshing relationship is best visible in FIG. 1 thus forming a cusp 23 between the two honing bodies into which a knife blade 24 is inserted in a honing action.

It will be noted that the sheets of the fabric extend radially slightly beyond the metal clamping plates so that the edge of the discs the fabric sheets tend to flare slightly axially so that the width of the cylindrical edge of the disc is substantially equal to the width of the disc at the metal clamping plates. When intermeshed, therefore, the fabric tends to brush against the fabric of the next adjacent disc even though there is a slight space in between the metal clamping plates of the adjacent discs.

The knife blade with which the present invention is primarily concerned is the type of knife blade used in the wood processing industry for example for chipping the wood into chips or particles for subsequent processing. Such knives are generally in the form of a flat plate with two flat parallel side surfaces 24A and 24B as best shown in FIG. 1 of rectangular shape with one beveled edge 25 acting as a knife blade.

The length of the knife blade is in this industry generally greater than 10 inches and can be significantly larger than 10 inches in length. The width of the discs is of the order of 1.5 inches so that the total width of the six stacked discs is of the order of nine inches. The blade therefore will in general have a length certainly greater than the width of a single disc, certainly greater than the width of two of the discs and preferably significantly greater than the plurality of the discs so that the knife blade can be inserted into the cusp and is maintained stable in the cusp by its engagement with the series of discs along the line defined by the cusps which is parallel to the axes.

In the method, the honing bodies are driven by the motors in directions indicated by the arrows D so that the outer surfaces of the discs move into the cusp 23. The knife blade is then moved into the cusp with its edge directly inserted into the cusp so as to lie parallel to the axes of the honing bodies. With the edge maintained in this position, the knife blade is moved back and forth in the direction parallel to the cusp but is across the width of the discs as indicated by the arrow W. During this movement, the knife blade remains in position bridging a number of the discs so that it remains stable with its edge in the cusp parallel to the axes.

A honing compound schematically indicated at C can be added onto one or more of the honing bodies so as to carry the compound into the cusp to engage the knife blade.

The type of knife as previously described is generally relatively thick so as to provide the necessary strength for the vigorous cutting action necessary for rapidly chipping or flaking lumber. Generally the chipping knives are mounted on a rotating disc so as to project forwardly from the disc while a stack of lumber in the form of rough cut trees is fed into the disc causing the blades to effect a chipping action. It will be appreciated that such blades therefore must have significant strength and therefore a blade of a thickness of at least 0.3 inches and 0.75 inches is common. The blade has two flat sides and is cut at an angle so that the inclined surface is inclined away from the longer flat side 24B at an angle in the range 25° to 45° and often of the order of 30°

It is necessary that the blade be sharpened on a regular basis since the blade has a cutting life of the order of 2 to 10 hours depending upon the quality of the wood being fed. In particular where the wood is frozen, the cutting life can be at a minimum of the order of two hours so that knives must be replaced frequently to maintain an effective cutting action. The replacement of knives thus requires of course that the removed knives be resharpened so that they can be returned to the chipper to continue as further replacements.

In some cases the blade is chipped or grooved at the cutting edge 25A between the surface 25 and the longer side surface 24B. Such chipping or grooving of the blade at that point must be removed in a grinding action. The more material is that removed in the grinding action requires a longer grinding period and also reduces the life of the blade since each grinding action reduces the width of the blade until it is reduced to a width which is no longer usable.

Figure 4:
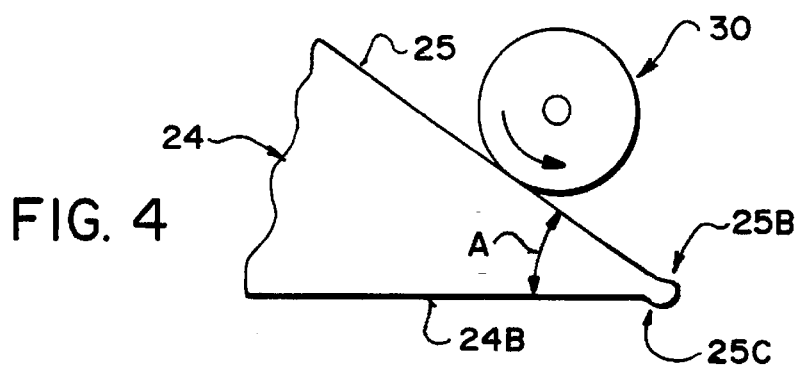
FIG. 4 is an enlarged cross-sectional view showing schematically the grinding action leading to generation of a burr wire at the sharpened edge of a knife blade.

The grinding action is therefore shown very schematically in FIG. 4 in which a grindstone 30 is applied onto the surface 25 so as to grind that surface to be directly flat at the required predetermined angle A to the side 24B. Machines for effecting the grinding action on a number of the blades simultaneously are well known and widely used in this industry. The grindstone used is relatively large and can be used to act upon a series of the blades using a carriage which provides the necessary relative movement.

It is well known that the grinding action provides the surface 25 as a substantially flat surface but acts to generate a burr wire 25B at the junction 25C between the ground surface 25 and the side 24B. The burr wire thus projects outwardly from the junction and forms a bead or wire along the edge. The existence of this burr wire is of course well known and can be readily felt by simply touching the edge. It is well known that this burr wire must be removed. Normally the burr wire is removed by a manual honing action in which a honing stone is applied on both surfaces 24B and 25 adjacent the junction 25C.

This manual honing action requires an additional manual step which is undesirable and provides a relatively ineffective result.

The present invention therefore provides the improved honing action generated by the honing bodies previously described. This honing action is shown in more detail in FIG. 5 in which the honing bodies are shown on an enlarged scale acting upon the surfaces 25 and 24B.

Figure 5:
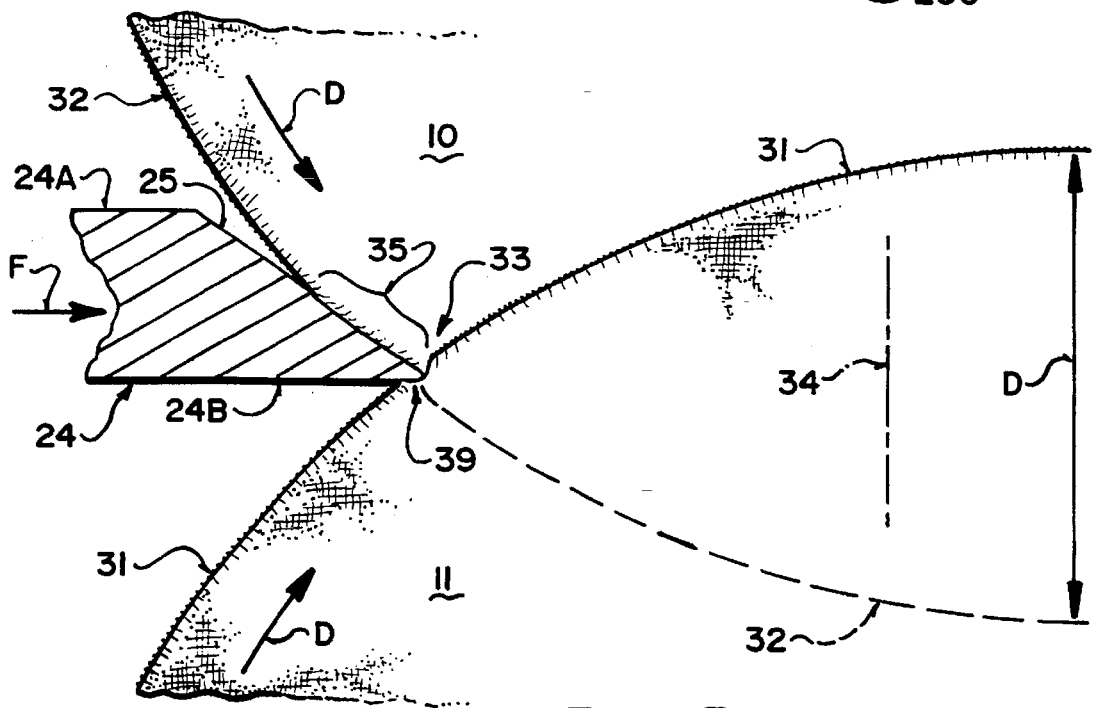
FIG. 5 is an enlarged cross-sectional view showing the honing action by the two honing bodies on the knife blade.

Thus as shown in FIG. 5, the fibrous surfaces 31 and 32 of the honing bodies 10 and 11 engage the surfaces 24B and 25 in the honing action. Normally the knife blade is supported and moved toward the cusp 33 so that the surface 24B lies generally at right angles to a line 34 joining the centres of the honing bodies.

The dimensions of the honing bodies are arranged so that the discs have a diameter greater than 6 inches and preferably of the order of 10 inches with a distance of overlap indicated at D which is greater than 1 inch and generally of the order of 2 inches. It has been found that an amount of overlap of 1 inch or less causes the knife blade to be drawn into the cusp and to jam the rotation of the discs.

The amount of the overlap is selected so as to be greater than the above amount and also so that the discs operate on a small part only of the surface 24B as indicated at 34 and over a range or portion of the surface 24A as indicated at 35.

Figure 6:
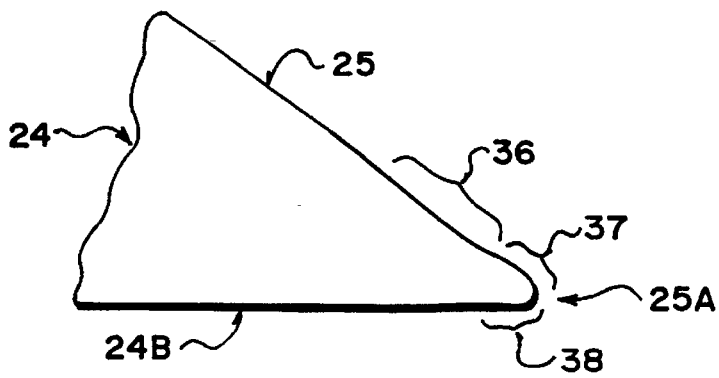
FIG. 6 is an enlarged view similar to that of FIG. 4 showing the cross-sectional shape of the knife blade after honing.

The fibrous surface 31 and 32 of the discs is compressible in a radial direction so that the application of a force F tending to push the knife blade toward the cusp acts to slightly deform the surface from the nominally cylindrical surface. Thus as shown in FIG. 5, the nominally cylindrical surface of the honing body 10 engages the part 35 only of the surface 25 from the junction 25C back toward the surface 24A and this generally cylindrical portion of the surface 32 acts to tend to form a slightly concave portion of the surface 25 over that area of engagement as indicted at 35. At the junction 25C, the material forming the surface 32 is compressed so that the material wraps around the junction 25C to form a convex portion 25A at the junction 25C. Thus the slightly concave portion is indicated in FIG. 6 at 36 and the convex portion is indicated at 37.

Similarly the surface 31 is compressed at the point of engagement with the junction so as to wrap around the junction and again to form a convex portion 38 of the surface 24B. The amount of overlap is therefore arranged relative to the diameter of the disc so that there is little or no tendency to pull the knife blade into the cusp and so that the surface of the discs effects a honing action on a part only of the inclined surface 25, It has been found that the honing action provided by the above arrangement causes a honing and shaping of the junction 25A so as to remove all grooves and score marks in the surfaces 25 and 24B at the junction and to provide a shaping of the apex or junction which is smoothly curved around the junction as indicated best in FIG. 6. This shaping effect provides a cutting action of the blade which is significantly enhanced which allows an increase in cutting life between sharpening of 20 to 40% relative to the conventional manual honing action.

The problem regarding the honing of the burr wire has been known for many years and only now the solution has been found which not only provides an improved or more simplified honing action but at the same time significantly increases the life and performance of the blade relative to the manual operation. This improvement can simply be demonstrated by comparing the cutting action of two blades prepared by the different processes in which the depth of cut is significantly increased using the improved arrangement of the present invention.

Yet further there is a sito chip in are reduced tendency of the blade to chip in an aggressive cutting situation and it will be appreciated that reduced chipping of the blades avoids the necessity for increased grinding with the disadvantages that that entails.

Figure 8:
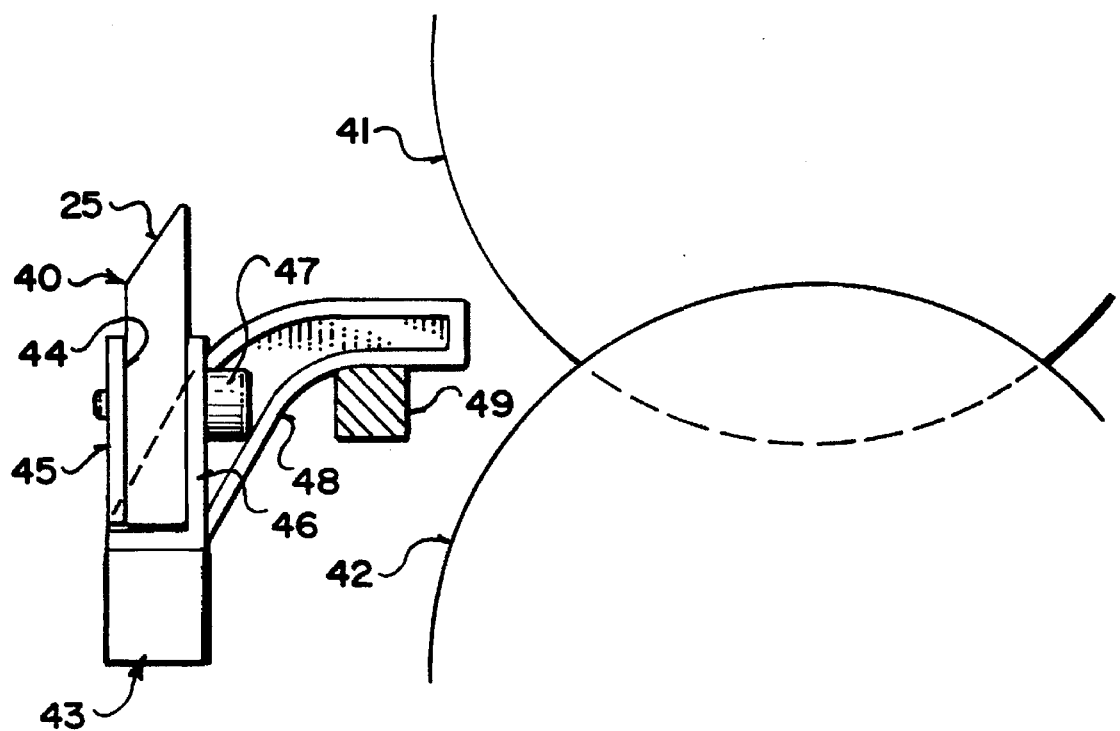
FIG. 8 is a side elevational view similar to that of FIG. 1 showing a carriage for supporting a knife blade in the honing action.

As shown in FIG. 8 there is provided a carriage for receiving and guiding the blade 40 into the cusp between two honing bodies 41 and 42. The carriage comprises a support member 43 defining a slot 44 between two side walls 45 and 46 with a clamping system 47, shown only schematically, which acts to squeeze the blade and hold it in position within the slot 44 on the mounting assembly 43.

The support member assembly 43 is mounted for sliding movement in a guide track 48. The guide track causes the mounting assembly and therefore the blade 40 carried thereby to be moved from an initial vertical position in which the blade is mounted in place to a horizontal position for movement into the cusp. The guide track 48 is mounted in a slide carriage schematically indicated at 49 which allows the guide track and therefore the support member 43 to be moved from side to side while in the horizontal position.

Thus the blade 40 is initially mounted in the mounting assembly and clamped in place while the support member is in the vertical position as shown. The blade can thus simply be dropped into the slot with the cutting edge 25 facing upwardly. The support member 43 is then pushed upwardly and rearwardly toward the cusp. In the raised position, there is allowed a degree of forward and rearward movement while the blade is maintained in the horizontal position to accommodate differences in width of the blade while supported in the support member 43. When the blade is pushed into the cusp, the carriage 49 allows the blade to be moved back and forth within the honing bodies as previously described.

The carriage therefore provides a manual assist which holds the blade and controls its movement into the cusp and then side to side so that there is no necessity for the operator to control these positions although the operator provides the necessary force to move from the loading position to the operating position and to translate the blade in the operating position.

It has been found with this technique that a significantly improved finishing of the honing of the knife blade can be effected providing at least a 20 per cent increase in knife operating time before a resharpening is necessary. In addition the honing step of the present invention can be effected very quickly and very simply in view of the stability of the knife during the honing action.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of sharpening a knife blade comprising:

providing a knife blade having a first flat surface, a second flat surface parallel to the first flat surface and spaced therefrom by a thickness of the knife blade and a third surface inclined at a predetermined angle from the first surface to the second surface;

grinding the third surface of the knife blade at the predetermined angle relative to the first flat surface to render the third surface substantially flat and to define a cutting edge at a junction between the first and third surfaces;

the grinding causing formation of a burr wire at the junction between the first and third surfaces;

and removing the burr wire by the steps of:

providing a first and a second honing body, each honing body having an axis of rotation;

each honing body having thereon at least one disc defining a generally cylindrical outer surface and two side surfaces at right angles to an axis of the disc, the disc axis being coaxial with the axis of rotation of the honing body;

mounting the honing bodies with the axes thereof parallel and spaced by distance less than a sum of the radii of the discs and with the discs of the honing bodies offset in a direction parallel to the axes such that said at least one disc of the first honing body intermeshes with said at least one disc of the second honing body to define a cusp therebetween;

forming the discs such that the cylindrical outer surfaces thereof are defined by a flexible, radially compressible fibrous material;

engaging the knife into the cusp so as to engage simultaneously the first and second honing bodies;

the knife blade having a length greater than an axial length between the side surfaces of the discs so as to engage simultaneously in said cusp at least one disc of each of said first and second honing bodies;

rotating each of the honing bodies about its axis in a direction such that the outer surface of said at least one disc moves into the cusp;

and moving the knife blade while in the cusp in a direction parallel to the axes of the honing bodies.

2. The method according to claim 1 wherein each disc comprises a series of circular sheets of a woven fabric clamped face to face such that exposed yarns and fibers at the edges of the sheets define the cylindrical outer surface.

3. The method according to claim 2 wherein each disc includes a plurality of separate disc elements, each comprising a plurality of fabric sheets which are connected together into the disc element by quilted stitching.

4. The method according to claim 2 wherein the sheets are clamped by a pair of parallel rigid clamping plates with each plate having a diameter less than that of the sheets and lying in a radial plane of the axis of rotation of the disc.

5. The method according to claim 4 wherein the discs of the honing bodies are offset by a distance substantially equal to the spacing between the side surfaces of the discs such that the clamping plates of one disc lie immediately adjacent clamping plates of adjacent discs.

6. The method according to claim 1 including applying a honing compound to the outer surfaces of the discs.

7. The method according to claim 1 wherein the discs have a diameter of greater than six inches and the amount of overlap is greater than one inch.

8. The method according to claim 1 wherein the amount of overlap is arranged such that there is substantially no force tending to pull the knife blade into the cusp.

9. The method according to claim 1 wherein the amount of overlap is arranged relative to the predetermined angle and the thickness of the knife blade such that the discs effect a honing action on a part only of the third surface.

10. The method according to claim 9 wherein the disc engaging the third surface tends to form a concave portion of the third surface at a position adjacent to but spaced from the junction and forms a convex portion immediately at the junction.

11. The method according to claim 1 wherein the disc engaging the first surface is compressible by an amount sufficient to wrap around the knife blade at the junction to form a convex portion of the first surface at the junction.

12. The method according to claim 1 including providing a support carriage for receiving and supporting the knife blade, the carriage including clamping means for clamping the knife blade, first moving means for moving the clamping means and the knife blade therein in a direction generally radially of the honing bodies toward and away from the cusp and second moving means for moving the clamping means and the knife blade therein in a direction axially of the honing bodies.

* * * * *